US009021441B2

(12) United States Patent
Yawalkar et al.

(10) Patent No.: US 9,021,441 B2
(45) Date of Patent: Apr. 28, 2015

(54) METHODS AND SYSTEMS OF DETERMINING A QUALITY LEVEL OF A SOFTWARE INSTANCE

(75) Inventors: Shrirang V. Yawalkar, Flower Mound, TX (US); Balaji Kumar, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1101 days.

(21) Appl. No.: 12/413,775

(22) Filed: Mar. 30, 2009

(65) Prior Publication Data

US 2010/0251027 A1    Sep. 30, 2010

(51) Int. Cl.
*G06F 11/00* (2006.01)
*G06F 11/36* (2006.01)

(52) U.S. Cl.
CPC ................... *G06F 11/3616* (2013.01)

(58) Field of Classification Search
CPC ... G06F 11/3616; G06F 8/77; G06F 11/3604; G06F 11/3676
USPC .......... 717/124–126, 105, 109, 113; 715/733–759
See application file for complete search history.

(56) References Cited

U.S. PATENT DOCUMENTS

| | | | | |
|---|---|---|---|---|
| 4,924,331 | A * | 5/1990 | Robinson et al. | 360/72.1 |
| 5,655,074 | A * | 8/1997 | Rauscher | 714/38.1 |
| 7,490,081 | B2 * | 2/2009 | Best et al. | 1/1 |
| 7,774,743 | B1 * | 8/2010 | Sanchez et al. | 717/103 |
| 8,024,807 | B2 * | 9/2011 | Hall et al. | 726/25 |
| 2002/0029376 | A1 * | 3/2002 | Ambrose et al. | 717/113 |
| 2003/0039403 | A1 * | 2/2003 | Robins | 382/275 |
| 2004/0133881 | A1 * | 7/2004 | Chamberlain et al. | 717/125 |
| 2004/0205727 | A1 * | 10/2004 | Sit et al. | 717/125 |
| 2008/0027680 | A1 * | 1/2008 | Garzia et al. | 702/182 |
| 2009/0191858 | A1 * | 7/2009 | Calisti et al. | 455/422.1 |

OTHER PUBLICATIONS

Thomas Ostrand & Elaine Weyuker, The distributiuon of faults in a large industrial software system, Jul. 2002, ACM SIGSOFT, Software Engineering Notes vol. 27 Issue 4, p. 61.*
Steve McConnell, Gauging Software Readiness with Defect Tracking, May-Jun. 1997, IEEE, IEEE Software vol. 14 No. 3, p. 1.*
Thomas Ostrand & Elaine Weyuker, "The Distribution of Faults in a Large Industrial Software System", Jul. 2002, all pages.*
McConnell, "Gauging Software Readiness With Defect Tracking", IEEE, Software "Best Practices" Column, vol. 14—No. 3, Jun. 1997, all pages.*

* cited by examiner

*Primary Examiner* — Chat Do
*Assistant Examiner* — Sergio J Curbelo, III

(57) ABSTRACT

An exemplary method includes displaying a graphical user interface configured to facilitate identification of one or more defects in a software instance, receiving data representative of at least one instruction via the graphical user interface to associate one of a plurality of defect severity levels each having one of a plurality of weighted values with each of the one or more defects, and generating a product quality index corresponding to the software instance and that indicates a quality level of the software instance compared to a substantially defect-free software instance. In some examples, the generation of the product quality index is based on the defect severity levels and the weighted values associated with the one or more defects.

19 Claims, 12 Drawing Sheets

Defect Severity Level Preferences

| Defect Severity Level | Description | Weighted Value | Options | |
|---|---|---|---|---|
| 1 | Showstopper | 5.00 | Edit | Delete |
| 2 | Critical | 3.00 | Edit | Delete |
| 3 | Major | 1.00 | Edit | Delete |
| 4 | Minor | 0.10 | Edit | Delete |
| 5 | Change Request | 0.00 | Edit | Delete |

Add

Fig. 7

METHODS AND SYSTEMS OF DETERMINING A QUALITY LEVEL OF A SOFTWARE INSTANCE

BACKGROUND INFORMATION

Quality assurance is often an integral part of software development. For example, quality assurance personnel may test newly-developed software, identify defects contained within the software, and determine whether the software is of high enough quality to be released to end users.

Unfortunately, conventional quality assurance tools suffer from several shortcomings. For example, it is often difficult to quantify a quality level of a software product and to compare quality levels of different software products or different versions of the same software product. Moreover, it is often difficult to objectively determine whether the certification processes followed by quality assurance personnel to identify defects within software products are efficient and effective.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 shows a GUI configured to facilitate modification of one or more weighted values associated with one or more defect severity levels according to principles described herein.

DETAILED DESCRIPTION OF PREFERRED EMBODIMENTS

Figure 1:
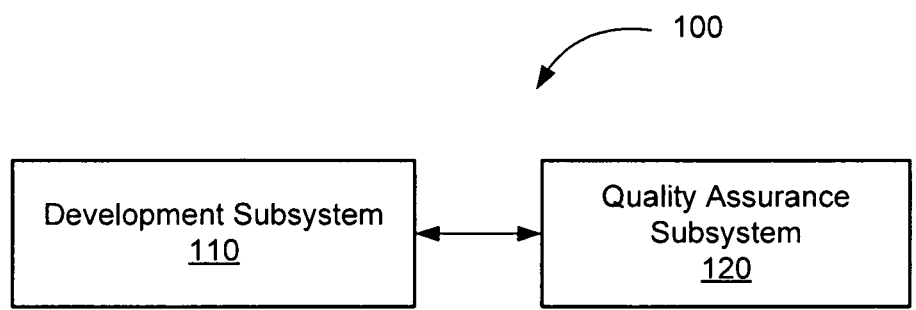
FIG. 1 illustrates an exemplary software development system according to principles described herein.

Methods and systems of determining a quality level of a software instance are described herein.

An exemplary method includes displaying a graphical user interface configured to facilitate identification of one or more defects in a software instance, receiving data representative of at least one instruction via the graphical user interface to associate one of a plurality of defect severity levels each having one of a plurality of weighted values with each of the one or more defects, and generating a product quality index corresponding to the software instance and that indicates a quality level of the software instance compared to a substantially defect-free software instance. In some examples, the generation of the product quality index is based on the defect severity levels and the weighted values associated with the one or more defects.

An exemplary system includes a processing facility configured to direct a display to display a graphical user interface configured to facilitate identification of one or more defects in a software instance and a product quality index generation facility communicatively coupled to the processing facility. The product quality index generation facility is configured to associate one of a plurality of defect severity levels each having one of a plurality of weighted values with each of the one or more defects in response to at least one instruction received via the graphical user interface and to generate a product quality index corresponding to the software instance and that indicates a quality level of the software instance compared to a substantially defect-free software instance. In some examples, the generation of the product quality index is based on the defect severity levels and the weighted values associated with the one or more defects.

Another exemplary system includes a development subsystem configured to facilitate development of a software instance and a quality assurance subsystem selectively and communicatively coupled to the development subsystem. The quality assurance subsystem is configured to display a graphical user interface configured to facilitate identification of one or more defects in the software instance, receive data representative of at least one instruction to associate one of a plurality of defect severity levels each having one of a plurality of weighted values with each of the one or more defects, and generate a product quality index corresponding to the software instance and that indicates a quality level of the software instance compared to a substantially defect-free software instance. In some examples, the generation of the product quality index is based on the defect severity levels and the weighted values associated with the one or more defects.

An exemplary computer-readable medium includes instructions configured to direct a computing device, processor, or any other device to display a graphical user interface configured to facilitate identification of one or more defects in a software instance, receive data representative of at least one instruction via the graphical user interface to associate one of a plurality of defect severity levels each have one of a plurality of weighted values with each of the one or more defects, and generate a product quality index corresponding to the software instance and that indicates a quality level of the software instance compared to a substantially defect-free software instance, the generation based on the defect severity levels and the weighted values associated with the one or more defects.

The methods, systems, and computer-readable mediums described herein may facilitate identification of one or more defects within a software instance and determination of a quantifiable quality level of the software instance. The quality level may be used by software developers to determine which of the identified defects within the software instance should be addressed. As used herein, "addressing" a defect identified within a software instance refers to any remedial action taken by one or more software developers with respect to the defect. For example, one or more software developers may address a defect by fixing the defect, removing the defect from the software instance, lessening the severity of the defect, and/or by performing any other remedial action with respect to the defect as may serve a particular application. The identified defects and determined quality level may also be used to determine whether the certification processes used by quality assurance personnel are efficient and effective and/or for any other purpose as may serve a particular application.

FIG. 1 illustrates an exemplary software development system 100 (or simply "system 100"). As shown in FIG. 1, system 100 may include a development subsystem 110 and a quality assurance subsystem 120 configured to communicate with one another. As will be described in more detail below, development subsystem 110 may be configured to facilitate development of a software instance configured to be executed by one or more processing devices. Quality assurance subsystem 120 may be configured to facilitate identification of one or more defects within the software instance, classification of the one or more defects, and determination of a quality level of the software instance, as will also be described in more detail below.

Development subsystem 110 and quality assurance subsystem 120 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, Fiber-to-the-premises ("FTTP") technologies, Passive Optical Network ("PON") technologies, and other suitable communications networks and technologies.

In some examples, one or more components of system 100 may include any computer hardware and/or instructions (e.g., software programs including, but not limited to programming software (e.g., Microsoft Visual C, C++, Lua, HTML, Flash, OpenGL, etc.), simulation software, database software, web browsing software, etc.) or combinations of software and hardware, configured to perform one or more of the processes described herein. In particular, it should be understood that components of system 100 may be implemented on one physical computing device or may be implemented on more than one physical computing device. Accordingly, system 100 may include any one of a number of computing devices, and may employ any of a number of computer operating systems.

The processes described herein may be implemented at least in part as computer-executable instructions, i.e., instructions executable by one or more computing devices, tangibly embodied in a computer-readable medium. In general, a processor (e.g., a microprocessor) receives instructions from a computer-readable medium (e.g., a memory, etc.) and executes and/or directs execution of those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, development subsystem 110 and quality assurance subsystem 120 may communicate via one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between development subsystem 110 and quality assurance subsystem 120.

Figure 2:
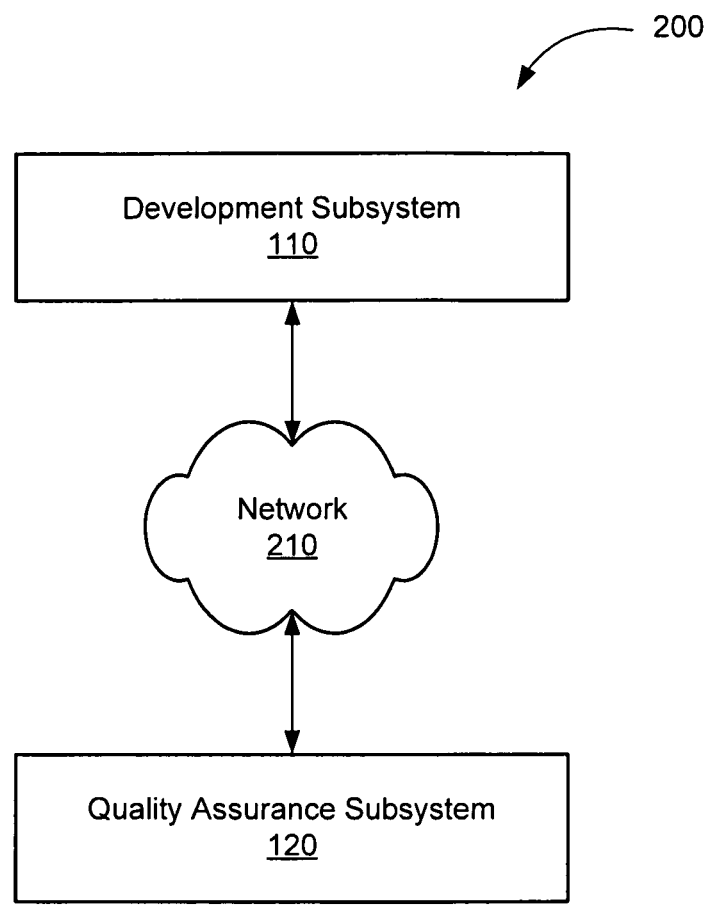
FIG. 2 shows an exemplary implementation of the system of FIG. 1 wherein a development subsystem and a quality assurance subsystem are communicatively coupled via a network according to principles described herein.

FIG. 2 shows an exemplary implementation 200 of system 100 wherein development subsystem 110 and quality assurance subsystem 120 are communicatively coupled via a network 210. Network 210 may include one or more networks, including, but not limited to, any of the networks listed above. Communications between development subsystem 110 and quality assurance subsystem 120 may be transported using any one of above-listed networks, or any combination or sub-combination of the above-listed networks. In some examples, development subsystem 110 and/or quality assurance subsystem 120 may be implemented at least in part on one or more servers or other network-enabled devices.

As mentioned, system 100 may be configured to facilitate development of one or more software instances configured to be executed by one or more processing devices. As used herein, a "processing device" may include, but is not limited to, a personal computing device (e.g., a desktop or laptop computer), a set-top box, a communication device (e.g., a phone device such as a Verizon Hub device), a media player, a wireless computing device, a wireless communication device (e.g., a mobile phone), a Global Positioning System ("GPS") device, a personal digital assistant, a content recording device (e.g., a camera, audio recorder, video camera), a television, a vehicular computing and/or communication device, a content-enabled device, a gaming device (e.g., a game console), and/or any other device configured to execute a software instance.

Figure 3:
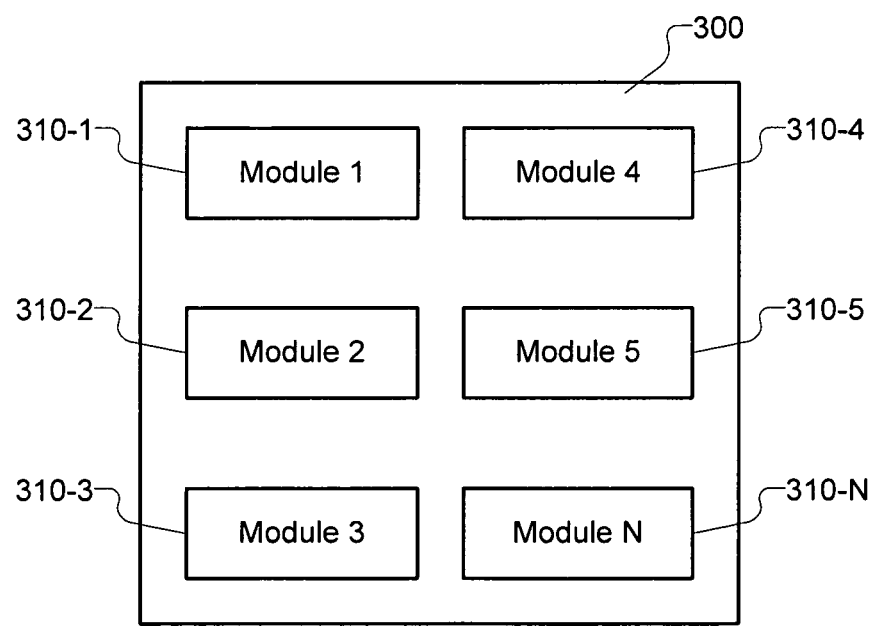
FIG. 3 illustrates an exemplary software product containing a plurality of modules according to principles described herein.

As used herein, the term "software instance" may refer to a software product (e.g., a software program or application), a module within a software product, and/or any other component of a software product as may serve a particular application. For example, FIG. 3 illustrates an exemplary software product 300 containing a plurality of modules 310-1 through 310-N (collectively referred to herein as "modules 310"). Any number of modules 310 may be included within software product 300 as may serve a particular application. Each module 310 may include a specific component, library, function, or other grouping of code within software product 300. Each module 310 may be configured to function independently of the other modules 310 or in conjunction with one or more other modules 310 as may serve a particular application.

Figure 4:
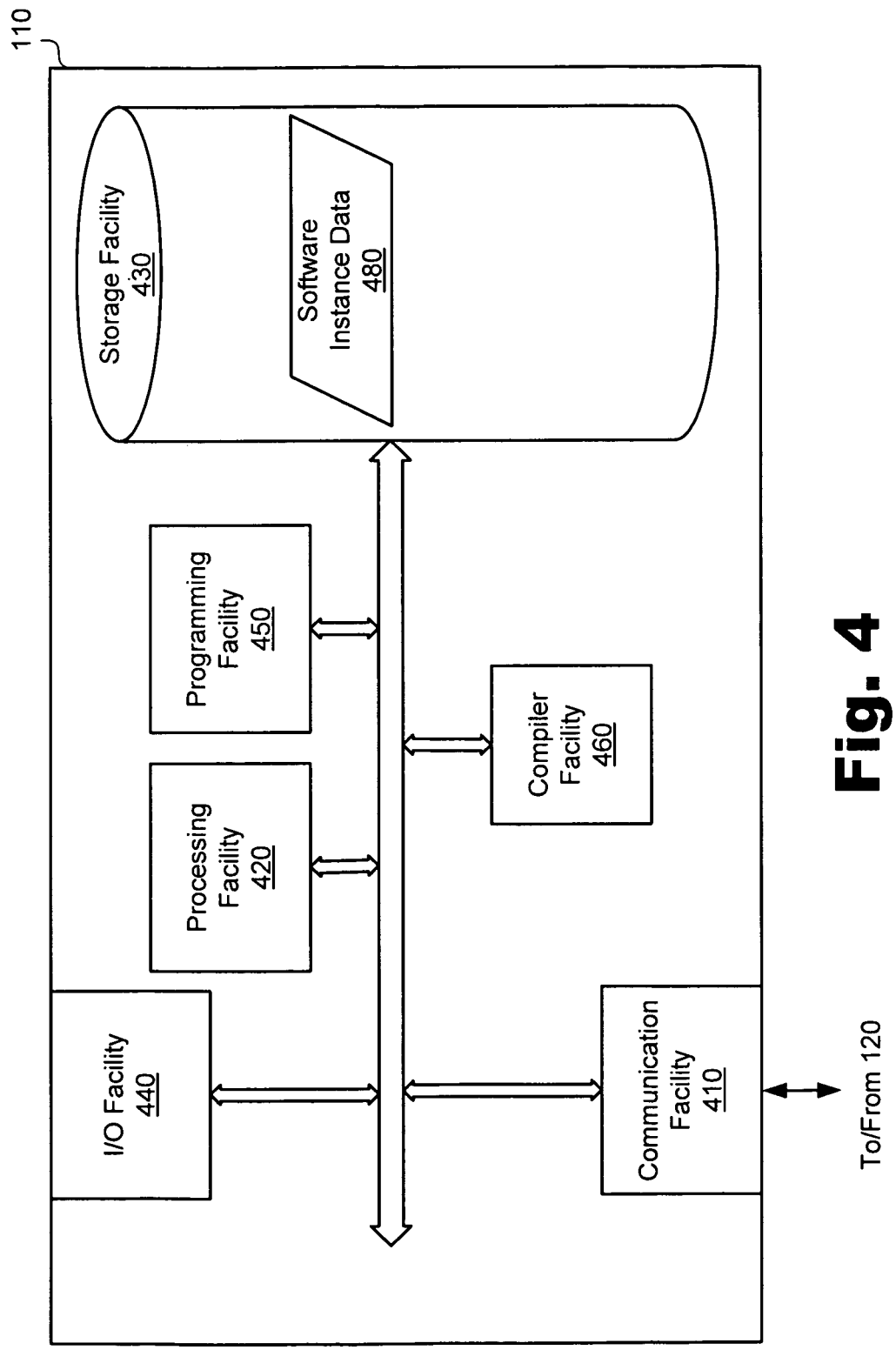
FIG. 4 illustrates components of an exemplary development subsystem according to principles described herein.

FIG. 4 illustrates components of an exemplary development subsystem 110. As shown in FIG. 4, development subsystem 110 may include a communication facility 410, a processing facility 420, a storage facility 430, an input/output ("I/O") facility 440, a programming facility 450, and a compiler facility 460 communicatively connected to one another. The facilities 410-460 may be communicatively connected using any suitable technologies. Each of the facilities 410-460 may be implemented as hardware, computing instructions (e.g., software) tangibly embodied on a computer-readable medium, or a combination of hardware and computing instructions configured to perform one or more of the processes described herein. In certain embodiments, for example, programming facility 450, compiler facility 460, and/or one or more other facilities may be implemented as one or more software applications embodied on a computer-readable medium such as storage facility 430 and configured to direct processing facility 420 of the development subsystem 110 and/or any other processing facility (e.g., a processing facility of quality assurance subsystem 120) to execute one or more of the processes described herein.

Communication facility 410 may be configured to communicate with quality assurance subsystem 120 (e.g., directly or over network 210), including sending and receiving data representative of a software instance, one or more defects within a software instance, and/or one or more defect severity levels associated with the defects to/from quality assurance subsystem 120. Communication facility 410 may include any device, logic, and/or other technologies suitable for transmitting and receiving such data. Communication facility 410 may be configured to interface with any suitable communication media, protocols, formats, platforms, and networks, including any of those mentioned herein.

Processing facility 420 may be configured to execute and/or direct execution of operations of one or more components of the development subsystem 110. Processing facility 420 may direct execution of operations in accordance with computer-executable instructions such as may be stored in storage facility 430 or another computer-readable medium.

Storage facility 430 may include one or more data storage media, devices, or configurations and may employ any type, form, and combination of storage media. For example, the storage facility 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the storage facility 430.

Different types of data, e.g., software instance data 480, may be maintained within storage facility 430. It will be recognized that data stored within storage facility 430 may additionally or alternatively be stored within any other storage medium as may serve a particular application.

Software instance data 480 may include any data associated with one or more software instances developed using development subsystem 110. For example, software instance data 480 may include source code created by a developer within any suitable programming language. Software instance data 480 may additionally or alternatively include compiled source code, documentation, and/or any other data as may serve a particular application.

I/O facility 440 may be configured to receive user input and provide user output and may include any hardware, firmware, software, or combination thereof supportive of input and output capabilities. For example, I/O facility 440 may include one or more devices for capturing or otherwise receiving user input, including, but not limited to, a keyboard or keypad, a touch screen component, a remote control, and/or receiver (e.g., an RF or infrared receiver).

I/O facility 440 may include one or more devices for presenting content for experiencing by a user, including, but not limited to, a graphics engine, a display, one or more display drivers, one or more audio speakers, and one or more audio drivers. Accordingly, I/O facility 440 may present content (e.g., display one or more graphical user interfaces ("GUIs")) for experiencing by the user.

Programming facility 450 may be configured to provide one or more tools for creating a software application. The tools may be configured to enable a developer to create, debug, format, modify, delete, annotate, access, retrieve, copy, move, send, request, receive, encrypt, decrypt, and/or otherwise manage software instance data and/or any other data as may serve a particular application. The tools may include or be provided using hardware, computer-readable instructions embodied on a computer-readable medium such as storage facility 430, or a combination of hardware and computer-readable instructions.

In some examples, the one or more tools provided by programming facility 450 may include one or more application clients configured to facilitate creation of source code that defines a software instance. Any suitable programming language may be used by programming facility 450 including, but not limited to, Microsoft Visual C, C++, Lua, HTML, Flash, and OpenGL.

Compiler facility 460 may be configured to perform one or more compiling operations on source code developed using programming facility 450. Compiler facility 460 may include hardware, computer-readable instructions embodied on a computer-readable medium such as storage facility 430 (e.g., one or more compiler engines), or a combination of hardware and computer-readable instructions. In certain embodiments, compiler facility 460 may be implemented as a software application embodied on a computer-readable medium such as storage facility 430 and configured to direct the processing facility 420 of the development subsystem 110 to execute one or more compilation operations described herein.

Figure 5:
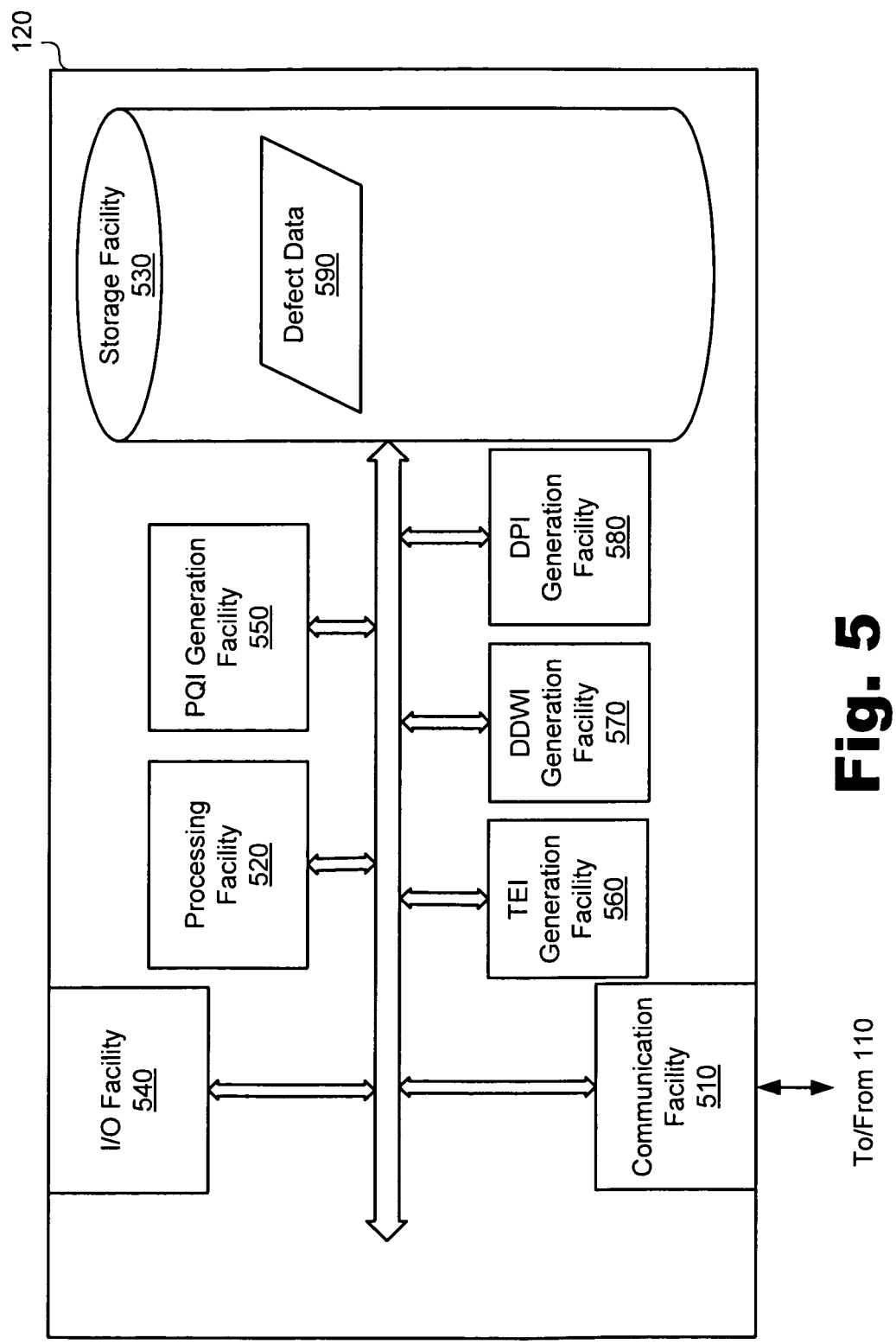
FIG. 5 illustrates components of an exemplary quality assurance subsystem according to principles described herein.

FIG. 5 illustrates components of an exemplary quality assurance subsystem 120. As shown in FIG. 5, quality assurance subsystem 120 may include a communication facility 510, a processing facility 520, a storage facility 530, an input/output ("I/O") facility 540, a product quality index ("PQI") generation facility 550, a test effectiveness index ("TEI") generation facility 560, a defect density weightage index ("DDWI") generation facility 570, and a defect propagation index ("DPI") generation facility 580 communicatively connected to one another. The facilities 510-580 may be communicatively connected using any suitable technologies. Each of the facilities 510-580 may be implemented as hardware, computing instructions (e.g., software) tangibly embodied on a computer-readable medium, or a combination of hardware and computing instructions configured to perform one or more of the processes described herein. In certain embodiments, for example, PQI generation facility 550, TEI generation facility 560, DDWI generation facility 570, DPI generation facility 580, and/or one or more other facilities may be implemented as one or more software applications embodied on a computer-readable medium such as storage facility 530 and configured to direct processing facility 520 of the quality assurance subsystem 120 and/or any other processing facility (e.g., of development subsystem 110) to execute one or more of the processes described herein.

Communication facility 510 may be configured to communicate with development subsystem 110 (e.g., directly or over network 210), including sending and/or receiving data representative of a software instance, one or more defects within a software instance, one or more defect severity levels associated with the defects, and/or other communications to/from development subsystem 110. Communication facility 510 may include any device, logic, and/or other technologies suitable for transmitting and receiving such data. Communication facility 510 may be configured to interface with any suitable communication media, protocols, formats, platforms, and networks, including any of those mentioned herein.

Processing facility 520 may be configured to execute and/or direct execution of operations of one or more components of the quality assurance subsystem 120. Processing facility 520 may direct execution of operations in accordance with computer-executable instructions such as may be stored in storage facility 530 or another computer-readable medium.

Storage facility 530 may include one or more data storage media, devices, or configurations and may employ any type, form, and combination of storage media. For example, the storage facility 530 may include, but is not limited to, a hard drive, network drive, flash drive, magnetic disc, optical disc, RAM, DRAM, other non-volatile and/or volatile storage unit, or a combination or sub-combination thereof. Data may be temporarily and/or permanently stored in the storage facility 530.

Different types of data may be maintained within storage facility 530. For example, as shown in FIG. 5, defect data 590 may be maintained within storage facility 530. It will be recognized that data stored within storage facility 530 may additionally or alternatively be stored within any other storage medium as may serve a particular application.

Defect data 590 may include any data descriptive of or otherwise associated with one or more defects identified within a software instance. For example, defect data 590 may include descriptions of one or more defects within a software instance, identification numbers associated with the one or more defects, and/or any other data associated with the one or more defects as may serve a particular application.

In some examples, defect data 590 may further include data representative of a defect severity level associated with a particular defect identified within a software instance. As will be described in more detail below, defect severity levels may be used to compare a relative severity of each of the defects identified within a software instance.

I/O facility 540 may be configured to receive user input and provide user output and may include any hardware, firmware, software, or combination thereof supportive of input and output capabilities. For example, I/O facility 540 may include one or more devices for capturing or otherwise receiving user input, including, but not limited to, a keyboard or keypad, a mouse, a microphone, a touch screen component, a remote control, and/or a receiver (e.g., an RF or infrared receiver). Accordingly, a user may input one or more instructions or commands to quality assurance subsystem 120 to identify one or more defects within a software instance and/or to associate one or more defect severity levels with one or more of the identified defects.

I/O facility 540 may include one or more devices for presenting content for experiencing by a user, including, but not limited to, a graphics engine, a display, one or more display drivers, one or more audio speakers, and one or more audio drivers. Accordingly, I/O facility 540 may present content (e.g., display one or more GUIs configured to facilitate identification of one or more defects in a software instance) for experiencing by the user.

PQI generation facility 550 may be configured to generate a product quality index corresponding to a software instance. The product quality index may indicate a quality level of the software instance compared to a substantially "defect-free" or "perfect" software instance. The product quality index will be described in more detail below.

TEI generation facility 560 may be configured to generate a test effectiveness index corresponding to a software instance. The test effectiveness index may be configured to measure the effectiveness of one or more certification processes followed by one or more users of quality assurance subsystem 120 to identify and classify defects contained within a software instance. Accordingly, as will be described in more detail below, the test effectiveness index may be used to identify one or more areas in which users of quality assurance subsystem 120 may improve. The test effectiveness index may additionally or alternatively be used to strengthen one or more certification processes followed in a development life cycle of the software instance.

DDWI generation facility 570 may be configured to generate a defect density weightage index corresponding to a software instance. The defect density weightage index may be configured to measure a density of defects contained within a software instance. As will be described in more detail below, the defect density weightage index may be used to indicate a stability level of the software instance.

In certain embodiments, DDWI generation facility 570 may be implemented as a software application embodied on a computer-readable medium such as storage facility 530 and configured to direct the processing facility 520 of the quality assurance subsystem 120 to execute one or more operations associated with the generation of the defect density weightage index.

DPI generation facility 580 may be configured to generate a defect propagation index corresponding to a software instance. The defect propagation index may be configured to measure how many defects identified during one or more quality assurance reviews propagate through to a final version of the software instance. The defect propagation index will be described in more detail below.

Various features, embodiments, and applications of system 100 will now be described. It will be recognized that the features, embodiments, and applications described herein are merely illustrative, and that system 100 may be configured to perform additional or alternative functions as may serve a particular application.

In some examples, quality assurance subsystem 120 may be configured to generate and display one or more GUIs configured to facilitate identification of one or more defects contained within a software instance. The one or more GUIs may be further configured to facilitate association of a defect severity level with each of the identified defects. As will be described in more detail below, identification of such defects and association of a defect severity level therewith may facilitate generation of one or more of the indices described herein.

Figure 6:
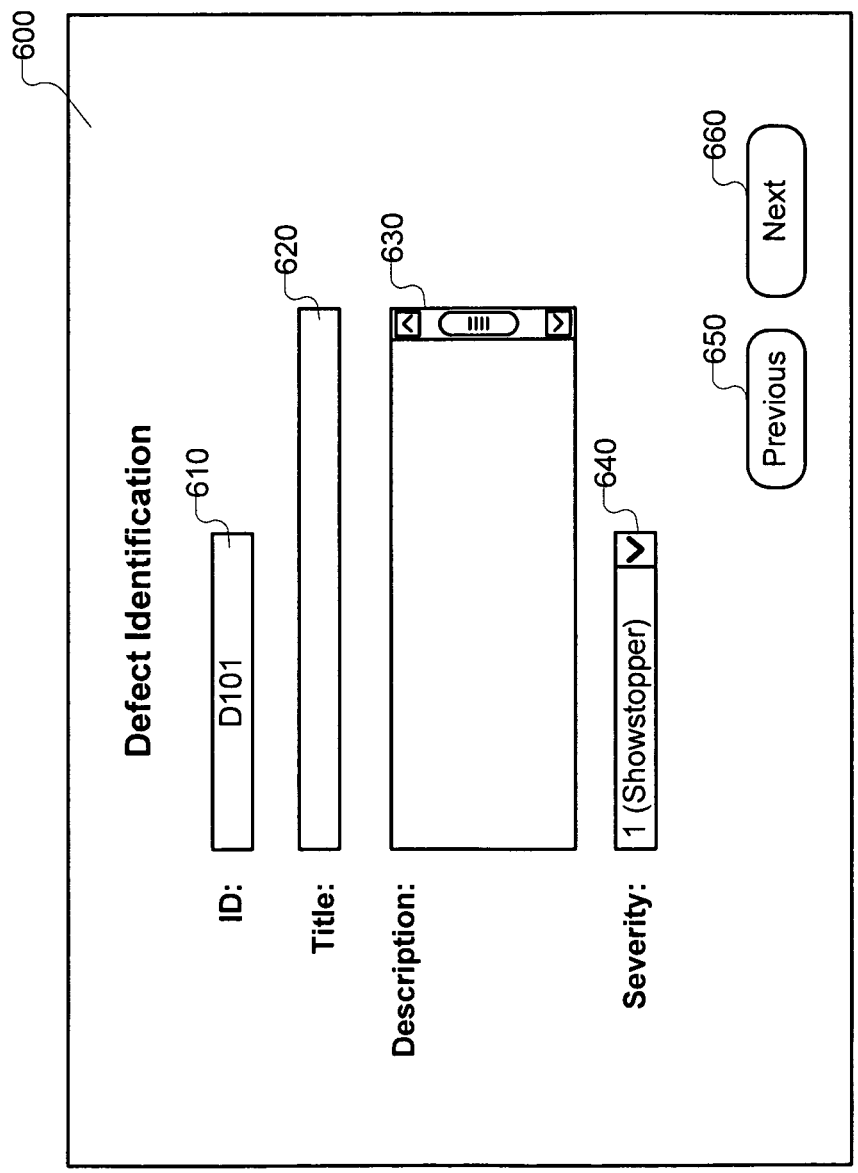
FIG. 6 shows an exemplary graphical user interface ("GUI") configured to facilitate identification of one or more defects contained within a software instance and association of a defect severity level with each of the identified defects according to principles described herein.

To illustrate, FIG. 6 shows an exemplary GUI 600 configured to facilitate identification of one or more defects contained within a software instance and association of a defect severity level with each of the identified defects. GUI 600 may be utilized by a user of quality assurance subsystem 120 (e.g., quality assurance personnel) or any other user as may serve a particular application. It will be recognized that GUI 600 is merely illustrative of the many different GUIs that may be used to facilitate identification of one or more defects within a software instance and association of a defect severity level with each of the identified defects. Moreover, it will be recognized that the one or more defects may alternatively be identified by one or more end users of the software instance, one or more processing devices, and/or any other user or device as may serve a particular application.

As shown in FIG. 6, various types of information associated with an identified defect may be recorded using GUI 600. For example, an identification number corresponding to the identified defect may be input into field 610. The identification number may be alternatively generated automatically and pre-populated within field 610 by quality assurance subsystem 120. Additionally or alternatively, a title corresponding to the identified defect may be input into field 620 and a description of the identified defect may be input into field 630. Any other type of information may additionally or alternatively be input into one or more other fields as may serve a particular application.

It will be recognized that some identified defects may be more severe than others. For example, a defect that causes a software instance to crash may warrant immediate attention by software developers while a defect that results in a minor glitch may be less of a priority for software developers to address. A user may utilize GUI 600 to associate (e.g., assign) a defect severity level to each identified defect. The defect severity level indicates a relative severity of each identified defect and in some embodiments how each identified defect may affect the performance and functionality of the software instance as a whole. As will be described in more detail below, defect severity levels associated with identified defects may be used by software developers to prioritize the order in which the identified defects are addressed.

Any number of defect severity levels may be specified as may serve a particular application. For example, Table 1 lists five exemplary defect severity levels that may be defined and used in accordance with the systems and methods described herein.

TABLE 1

| Defect Severity Level | Description |
| --- | --- |
| 1 | Showstopper |
| 2 | Critical |
| 3 | Major |
| 4 | Minor |
| 5 | Change Request |

As shown in Table 1, a first defect severity level may describe defects within a software instance that are deemed "showstoppers". These defects may be so severe that the software instance cannot function or be released to end users without the defects being addressed. A second defect severity level may describe defects that are deemed "critical". These defects are slightly less severe than showstopper defects, but still warrant immediate attention by software developers. A third defect severity level may describe defects that are deemed "major". These defects are less severe than critical defects, but may still affect the functionality and/or performance of the software instance in a relatively major way. A fourth defect severity level may describe defects that are deemed "minor". These defects may affect the functionality and/or performance of the software instance, albeit in a relatively minor way. A fifth defect severity level may describe defects that do not affect the functionality and/or performance of the software instance, but they may be addressed to improve one or more inconsequential aspects of the software instance.

It will be recognized that the defect severity levels shown in Table 1 are merely illustrative of the many different defect severity levels and/or sets of defect severity levels that may be specified by a user of quality assurance subsystem 120. In some examples, a user of quality assurance subsystem 120 may modify the descriptions associated with one or more of the defect severity levels shown in Table 1. Additionally or alternatively, a user may add or remove any number of defect severity levels that may be associated with an identified defect as may serve a particular application.

In some examples, PQI generation facility 550 and/or any other facility within quality assurance subsystem 120 may be configured to receive via GUI 600 data representative of at least one instruction to associate a defect severity level with an identified defect. For example, as shown in FIG. 6, a defect severity level may be associated with an identified defect by selecting an option from a drop-down menu 640, which menu 640 may include a plurality of selectable options corresponding to a set of defect severity levels. It will be recognized that a defect severity level may be associated with an identified defect in any other manner as may serve a particular application.

As shown in FIG. 6, a user may select one of navigation buttons 650 and 660 to navigate between viewing screens respectively associated with various identified defects. For example, after a particular defect has been identified, the user may select button 660 in GUI 600 to navigate to another viewing screen wherein the user may input information describing another defect.

In some examples, each defect severity level has a corresponding weighted value. The weighted values are configured to weight each defect severity level according to its relative severity. For example, Table 2 lists exemplary weighted values corresponding to each of the defect severity levels shown in Table 1.

TABLE 2

| Defect Severity Level | Weighted Value |
| --- | --- |
| 1 | 5.00 |
| 2 | 3.00 |
| 3 | 1.00 |
| 4 | 0.10 |
| 5 | 0.00 |

As shown in Table 2, the first defect severity level may have a weighted value of 5.00, the second defect severity level may have a weighted value of 3.00, the third defect severity level may have a weighted value of 1.00, the fourth defect severity level may have a weighted value of 0.10, and the fifth defect severity level may have a weighted value of 0.00.

It will be recognized that the weighted values shown in Table 2 are merely illustrative of the many different weighted values and combinations of weighted values that may be used in accordance with the systems and methods described herein. In some examples, a user may manually adjust one or more of the weighted values as may serve a particular application.

For example, FIG. 7 shows a GUI 700 configured to facilitate manual modification of one or more weighted values associated with one or more defect severity levels. As shown in FIG. 7, a number of options 710 may be associated with each defect severity level. One of the options 710 may include an option to edit one or more properties associated with a defect severity level. For example a user may utilize GUI 700 to modify a description associated with a particular defect severity level, a weighted value associated with a particular defect severity level, and/or any other property associated with a particular defect severity level. In some examples, GUI 700 may additionally or alternatively be used to add or remove one or more defect severity levels to the group of selectable defect severity levels.

In some examples, the defect severity levels and weighted values associated with the identified defects within a software instance may be used by PQI generation facility 550 to generate a product quality index corresponding to the software instance. An exemplary method or heuristic that may be used to generate a product quality index will now be described.

In some examples, the product quality index is measured on a scale of 0 to 10, wherein 10 represents a substantially "defect-free" or "perfect" software instance and 0 represents a "poor" software instance having one or more defects of unacceptable quality. As will be described in more detail below, the product quality index may be generated by PQI generation facility 550 in accordance with Equation 1:

$$PQI = 10 - \text{normalized}\left(\frac{TotalWeightage - PPW}{PPW}\right) \quad \text{(Equation 1)}$$

In the above equation, "PPW" is a constant representing a "perfect product weightage" having minimal defects. PPW is configured to account for the fact that one or more minimal defects may almost always be discovered within a "perfect" software instance. In the examples given herein, PPW is equal to 0.03 for illustrative purposes only. It will be recognized that PPW may have any suitable value as may serve a particular application.

The "total weightage" variable in Equation 1 represents a total weightage value for all of the defects identified within a software instance. The total weightage value may be generated by PQI generation facility 550 in accordance with Equation 2:

$$TotalWeightage = \sum_{i=1}^{x} D_i W_i \quad \text{(Equation 2)}$$

In Equation 2, i equals the defect severity level, x equals the total number of defect severity levels, $D_i$ equals the total number of identified defects that corresponds to each defect severity level, and $W_i$ equals the weighted value that corresponds to each defect severity level. Hence, the total weightage may be determined by determining the total number of identified defects that correspond to each defect severity level, multiplying these totals by the weighted values corresponding to the defect severity levels, and summing all of the products.

For example, five defect severity levels may be defined each having one of the weighted values shown in Table 2. If, within a particular software instance, five level 1 defects are identified, nine level 2 defects are identified, four level 3 defects are identified, ten level 4 defects are identified, and ten level 5 defects are identified, the total weightage is equal to 5(5.00)+9(3.00)+4(1.00)+10(0.10)+10(0.00), which equals 57.

Once a total weightage value has been determined, the term "(Total Weightage−PPW)/PPW" is normalized, as shown in Equation 1. The normalization may be to any number as may serve a particular application. For example, the term may be normalized to 1000. To illustrate, if the total weightage is equal to 57 and PPW is equal to 0.03, the normalized term "(Total Weightage−PPW)/PPW" is equal to 1.899. The normalized term is subtracted from 10 to obtain a product quality index for the software instance. In this example, the product quality index is equal to 8.11.

In some examples, Equation 1 may yield a negative value for the product quality index. In these cases, PQI generation facility 550 may be configured to set the product quality index equal to zero.

Once generated, a product quality index may be used to determine the relative quality level of a software instance compared to other software instances or to other versions of the software instance. For example, the product quality index may be measured at the end of each test cycle of a particular software instance and/or after each release of a new version of the software instance. In this manner, the quality of the software instance may be tracked over the entire life cycle of the software instance. To illustrate, Table 3 shows exemplary product quality index data corresponding to a plurality of releases of a particular software instance.

TABLE 3

| Release Number | Release Date | Defects ||||| Total Defects | PQI |
| | | Level 1 | Level 2 | Level 3 | Level 4 | Level 5 | | |
| --- | --- | --- | --- | --- | --- | --- | --- | --- |
| 1 | Sep. 18, 2008 | 3 | 9 | 14 | 7 | 1 | 34 | 8.11 |
| 2 | Oct. 12, 2008 | 3 | 20 | 19 | 8 | 4 | 54 | 6.84 |
| 3 | Oct. 29, 2008 | 3 | 25 | 24 | 9 | 5 | 66 | 6.17 |
| 4 | Nov. 20, 2008 | 1 | 41 | 9 | 7 | 7 | 65 | 5.41 |
| 5 | Dec. 14, 2008 | 17 | 32 | 32 | 10 | 1 | 92 | 2.87 |
| 6 | Dec. 21, 2008 | 3 | 32 | 46 | 14 | 2 | 97 | 4.76 |
| 7 | Jan. 7, 2009 | 6 | 7 | 9 | 9 | 0 | 31 | 7.97 |

As shown in Table 3, the number of defects identified within the software instance may vary from release to release of the software instance. The number of defects associated with each defect severity level may also vary depending on the particular software release. Without generating a product quality index for each software release, it may be difficult to gauge how the overall quality of the software instance changes as new releases of the software instance are generated. For example, Table 3 shows that 34 total defects were identified in the first release of the software instance while only 31 total defects were identified in the seventh release. However, as shown in Table 3, the seventh release actually has a lower product quality index than the first release because more of the defects contained within the seventh release are associated with the first defect severity level.

Figure 8:
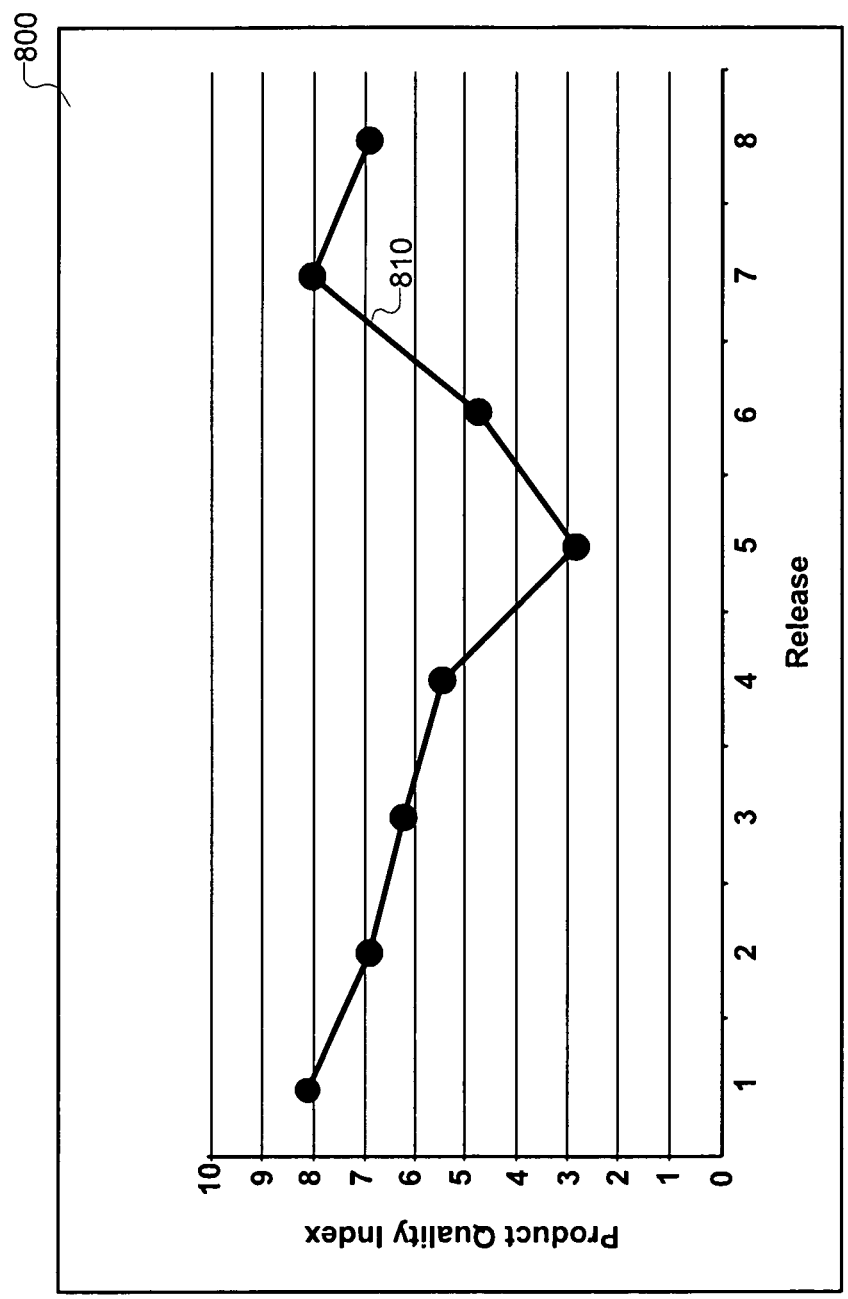
FIG. 8 illustrates a GUI configured to graphically depict a comparison of quality levels of a plurality of releases of a software instance according to principles described herein.

FIG. 8 illustrates a GUI 800 that may be generated and displayed by PQI generation facility 550 and that is configured to graphically depict a comparison of quality levels of a plurality of releases of a software instance. As shown in FIG. 8, GUI 800 may include a graph 810 configured to graphically display the product quality index information shown in Table 3. By viewing graph 810, a user may readily recognize which of the software instance releases has the highest product quality index (e.g., the first release in the example shown in FIG. 8) and which of the software instance releases has the lowest product quality index (e.g., the fifth release shown in the example of FIG. 8).

In some examples, a product quality index may be generated for each of a plurality of modules within a software product. In this manner, a user may compare the relative quality levels of each of the modules. Such comparison may be useful in determining which module merits the most attention by the software developers.

In some examples, the defect severity levels and weighted values associated with the identified defects within a software instance may additionally or alternatively be used by TEI generation facility 560 to generate a test effectiveness index corresponding to the software instance. As mentioned, the test effectiveness index may be configured to measure the effectiveness of one or more certification processes used by one or more users of quality assurance subsystem 120.

In some examples, the test effectiveness index may be generated by TEI generation facility 560 in accordance with Equation 3:

$$TEI=10-(PQI_{internal}-PQI_{combined})$$ (Equation 3)

In the above equation, $PQI_{internal}$ represents a product quality index based on defects identified within a software instance by one or more users of quality assurance subsystem 120 (e.g., one or more quality assurance personnel). $PQI_{combined}$ represents a product quality index based on a combination of defects identified by one or more users of quality assurance subsystem 120 and defects identified by one or more end users of the software instance. As used herein, an "end user" of a software instance refers to any customer or other user of the software instance not associated directly with the certification processes performed by users of quality assurance subsystem 120.

To this end, TEI generation facility 560 may be configured to receive data representative of one or more defects identified by one or more end users of the software instance. For example, data representative of such defects may be received over the phone by customer service representatives, via the Internet, and/or in any other manner as may serve a particular application. The data may be stored as defect data 590 within storage facility 530 and/or within any other storage facility as may serve a particular application.

TEI generation facility 560 may be configured to facilitate association of one or more defect severity levels with each of the defects identified by the end users of the software instance. To this end, TEI generation facility 560 may be configured to generate and display a GUI similar to GUI 600 shown in FIG. 6. A user of quality assurance subsystem 120 may utilize such a GUI to analyze each of the defects identified by end users and associate an appropriate defect severity level with each of the identified defects.

A combined product quality index may then be generated based on a combined total of all of the defects identified by one or more users of quality assurance subsystem 120 and by one or more end users of the software instance. The combined product quality index may be generated according to Equation 1 described above or in any other suitable manner.

A test effectiveness index corresponding to the software instance may then be generated in accordance with Equation 3. To illustrate, an exemplary internal product quality index may be equal to 8.11 and an exemplary combined product quality index may be equal to 7.05. Therefore, the test effectiveness index is equal to 10−(8.11−7.05), which equals 8.94.

Once generated, a test effectiveness index may be used to determine an efficiency of one or more certification processes followed in a software instance development life cycle. Based on Equation 3, the test effectiveness index is directly proportional to the effectiveness of the certification processes followed by users of quality assurance subsystem 120. For example, a relatively high test effectiveness index (e.g., 8.94) corresponds to a more effective certification process than does a relatively low test effectiveness index (e.g., 6.14).

In some examples, a test effectiveness index may be generated after each release of a new version of the software instance. The test effectiveness indices corresponding to each release may be compared one to another to determine whether the certification processes followed in the software instance development lifecycle are improving or are otherwise satisfactory.

To illustrate, Table 4 shows exemplary test effectiveness index data corresponding to a plurality of releases of a particular software instance.

TABLE 4

| Release Number | Release Date | TEI |
|---|---|---|
| 1 | Sep. 18, 2008 | 9.43 |
| 2 | Oct. 12, 2008 | 9.73 |
| 3 | Oct. 29, 2008 | 9.56 |
| 4 | Nov. 20, 2008 | 9.40 |
| 5 | Dec. 14, 2008 | 9.83 |
| 6 | Dec. 21, 2008 | 9.80 |
| 7 | Jan. 7, 2009 | 9.66 |
| 8 | Jan. 21, 2009 | 8.72 |

As shown in Table 4, the test effectiveness index may vary from release to release of a software instance. For example, Table 4 shows that the highest test effectiveness index occurred in the fifth release of the software instance while the lowest test effectiveness index occurred in the eighth release of the software instance. Without generating a test effectiveness index for each release, it may be difficult to gauge how the efficiency of the certification processes followed by one or more users of quality assurance subsystem 120 changes as new releases of the software instance are developed.

Figure 9:
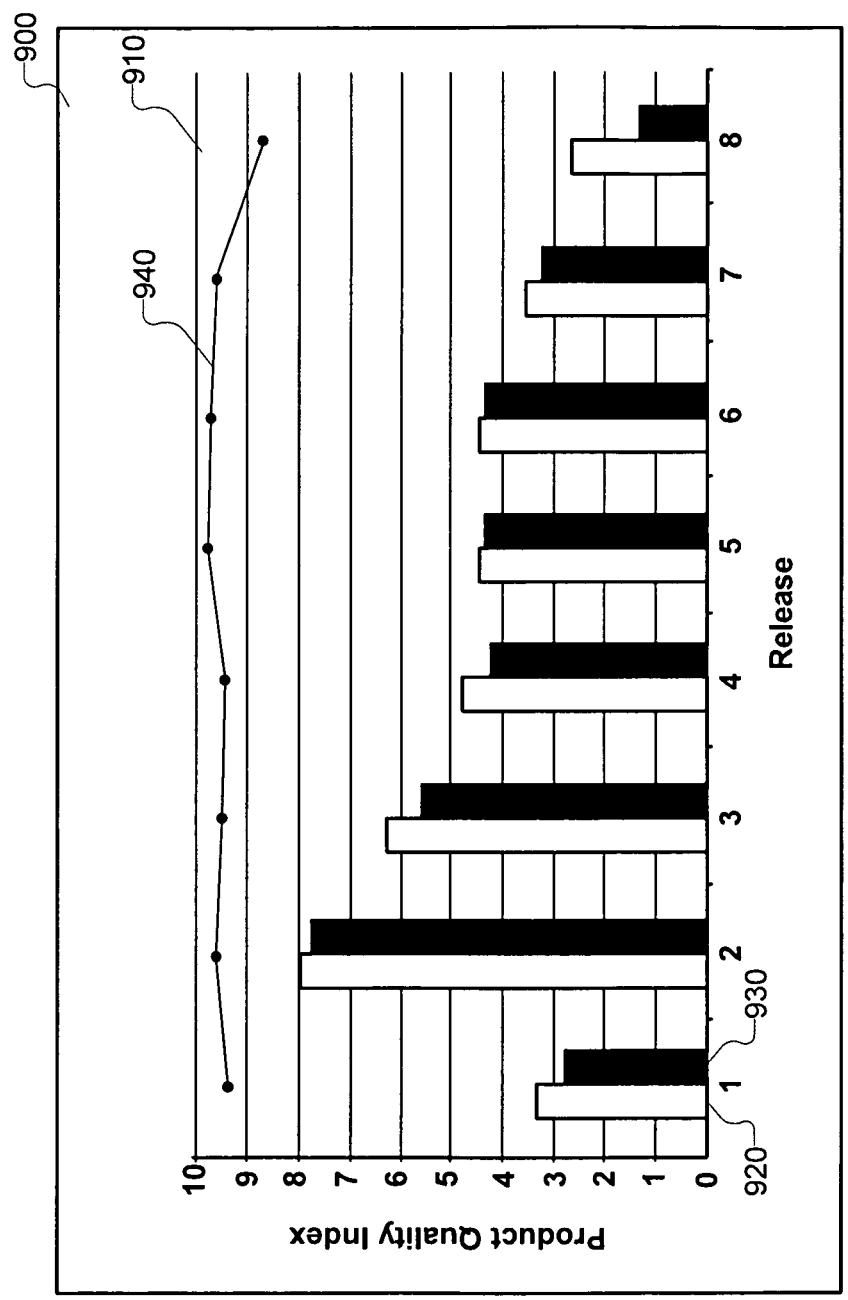
FIG. 9 illustrates a GUI configured to graphically depict how a test effectiveness index changes based on a particular release of a software instance according to principles described herein.

FIG. 9 illustrates a GUI 900 that may be generated and displayed by TEI generation facility 560 and that is configured to graphically depict how the test effectiveness index changes based on the particular release of a software instance. As shown in FIG. 9, GUI 900 may include a graph 910 configured to graphically display a comparison of an internal product quality index (represented by non-shaded bars, e.g., bar 920) and a combined product quality index (represented by shaded bars, e.g., bar 930) for each release of the software instance. GUI 900 may additionally or alternatively be configured to display a graphical representation 940 of a test effectiveness index corresponding to each of the software instance releases. By viewing graph 910, a user may readily recognize trends or anomalies with regard to the effectiveness of the certification processes used by one or more users of quality assurance subsystem 120.

In some examples, the defect severity levels and weighted values associated with the identified defects within a software instance may additionally or alternatively be used by DDWI generation facility 570 to generate a defect density weightage index corresponding to the software instance. As mentioned, the defect density weightage index may be configured to measure a stability level of a software instance. In some examples, a relatively high defect density weightage index corresponds to a relatively unstable software instance. Likewise, a relatively low defect density weightage index corresponds to a relatively stable software instance.

In some examples, the defect density weightage index may be generated by DDWI generation facility 570 in accordance with Equation 4:

$$DDWI = \frac{PQI}{LOC} * 1000 \tag{Equation 4}$$

In the above equation, PQI represents a product quality index corresponding to the software instance and may be calculated in accordance with Equation 1. LOC represents the number of lines of source code used to define the software instance.

Hence, DDWI generation facility 570 may be configured to generate a defect density weightage index per 1000 lines of code corresponding to a software instance by calculating the number of lines of source code defining a software instance. The defect density weightage index may then be computed by dividing a product quality index corresponding to the software instance by the total number of lines of source code defining the software instance and multiplying the result by 1000.

To illustrate, the product quality index corresponding to a particular software instance may be 9.96 and the number of lines of source code defining the software instance may be equal to 500. The defect density weightage index corresponding to the software instance is therefore equal to 19.93.

In some examples, a defect density weightage index may be generated for each module contained within a software product. In this manner, the stability level of each module may be compared one to another. Such information may be used by software developers to identify which module merits the most attention. To illustrate, Table 5 shows exemplary defect density weightage index data corresponding to a plurality of modules within a particular software product.

TABLE 5

| Module | LOC | PQI | DDWI |
|---|---|---|---|
| 1 | 500 | 9.96 | 19.93 |
| 2 | 2000 | 8.62 | 4.31 |
| 3 | 1000 | 8.72 | 8.72 |
| 4 | 1000 | 7.82 | 7.82 |

As shown in Table 5, a particular module (e.g., module 1) may have a relatively high product quality index, yet still have a relatively high defect density weightage index if a total number of lines of source code within the module is relatively low.

Figure 10:
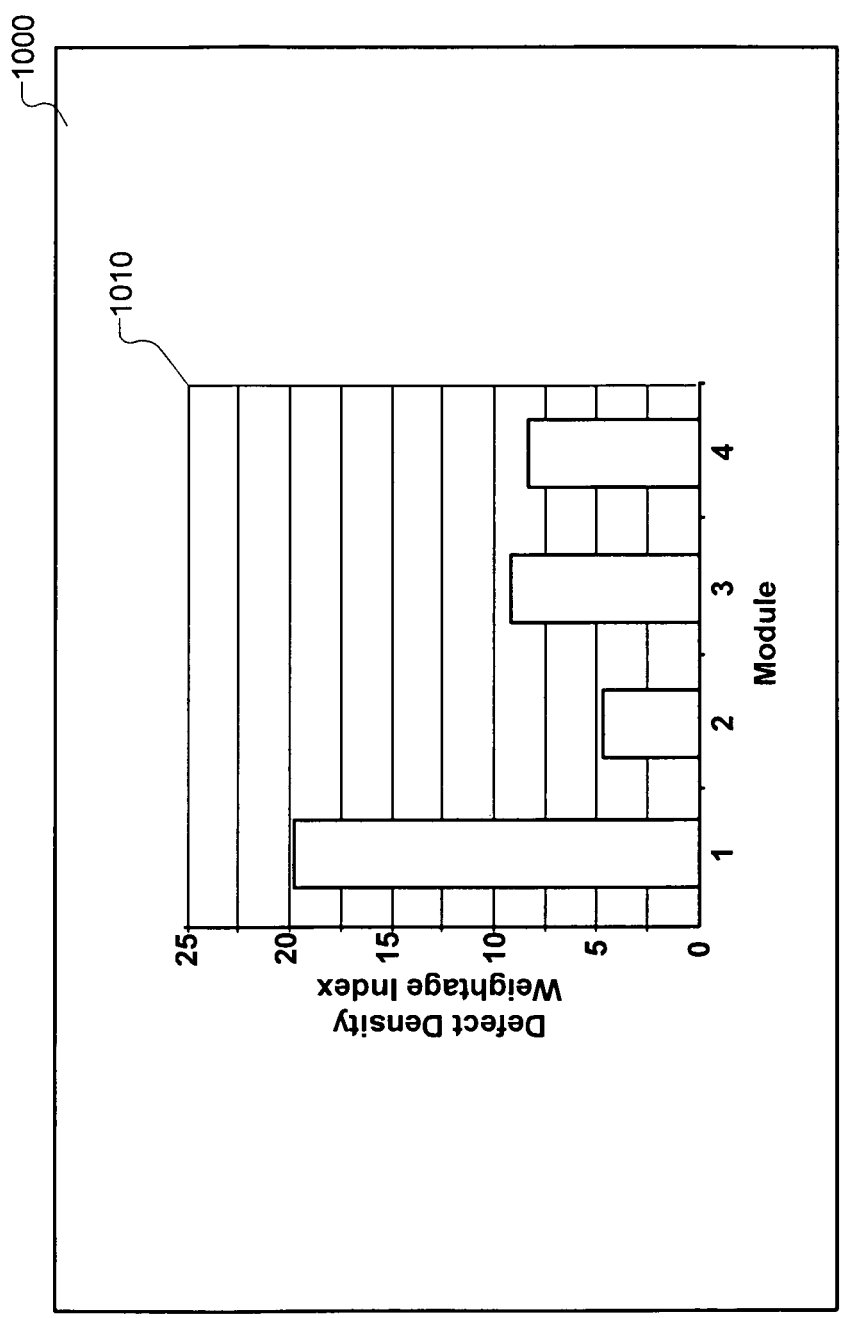
FIG. 10 illustrates a GUI configured to graphically depict a comparison of defect density weightage indices each corresponding to a particular module within a software product according to principles described herein.

FIG. 10 illustrates a GUI 1000 that may be generated and displayed by DDWI generation facility 570 and that is configured to graphically depict a comparison of defect density weightage indices each corresponding to a particular module within a software product. As shown in FIG. 10, GUI 1000 may include a graph 1010 configured to graphically display defect density weightage indices corresponding to modules 1 through 4 as listed in Table 5. By viewing graph 1010, a user may readily recognize relative stability levels of each of the modules within the software product.

In some examples, the number of defects identified within a software instance by one or more users of quality assurance subsystem 120 may be used by DPI generation facility 580 to generate a defect propagation index corresponding to the software instance. The defect propagation index may be configured to measure how many defects identified by one or more users of quality assurance subsystem 120 propagate through to a version of the software instance that is released to end users. The defect propagation index may be used to determine post-production costs associated with the software instance, such as costs associated with customer support, trouble ticket resolution, and/or any other post-production activity as may serve a particular application.

In some examples, the defect propagation index may be generated by DPI generation facility 580 in accordance with Equation 5:

$$DPI = \frac{D_{common}}{D_{QA}} * 1000 \tag{Equation 5}$$

In the above equation, $D_{common}$ represents a total number of common defects identified within a software instance by both one or more users of quality assurance subsystem 120 and one or more end users of the software instance. $D_{QA}$ represents a total number of defects identified within the software instance by one or more users of quality assurance subsystem 120.

In some examples, DPI generation subsystem 580 may be configured to analyze the defects identified by one or more users of quality assurance subsystem 120 and by one or more end users of the software instance in order to determine $D_{common}$ and $D_{QA}$. Any suitable technique or heuristic may be used to determine these variables.

To illustrate, one or more users of quality assurance subsystem 120 may identify three hundred (300) defects within a particular software instance. After the software instance is released to end users, the end users may identify and report the presence of one hundred (100) defects within the software instance. DPI generation subsystem 580 may compare the defects identified by the one or more users of quality assurance subsystem 120 with the defects identified by the end users and determine that there are thirty (30) common defects within all of the defects identified by both one or more users of quality assurance subsystem 120 and one or more end users. The defect propagation index is therefore equal to (30/300)*1000, which equals 100.

In some examples, a defect propagation index may be generated after each release of a particular software instance. In this manner, each of the defect propagation indices may be compared one to another.

Figure 11:
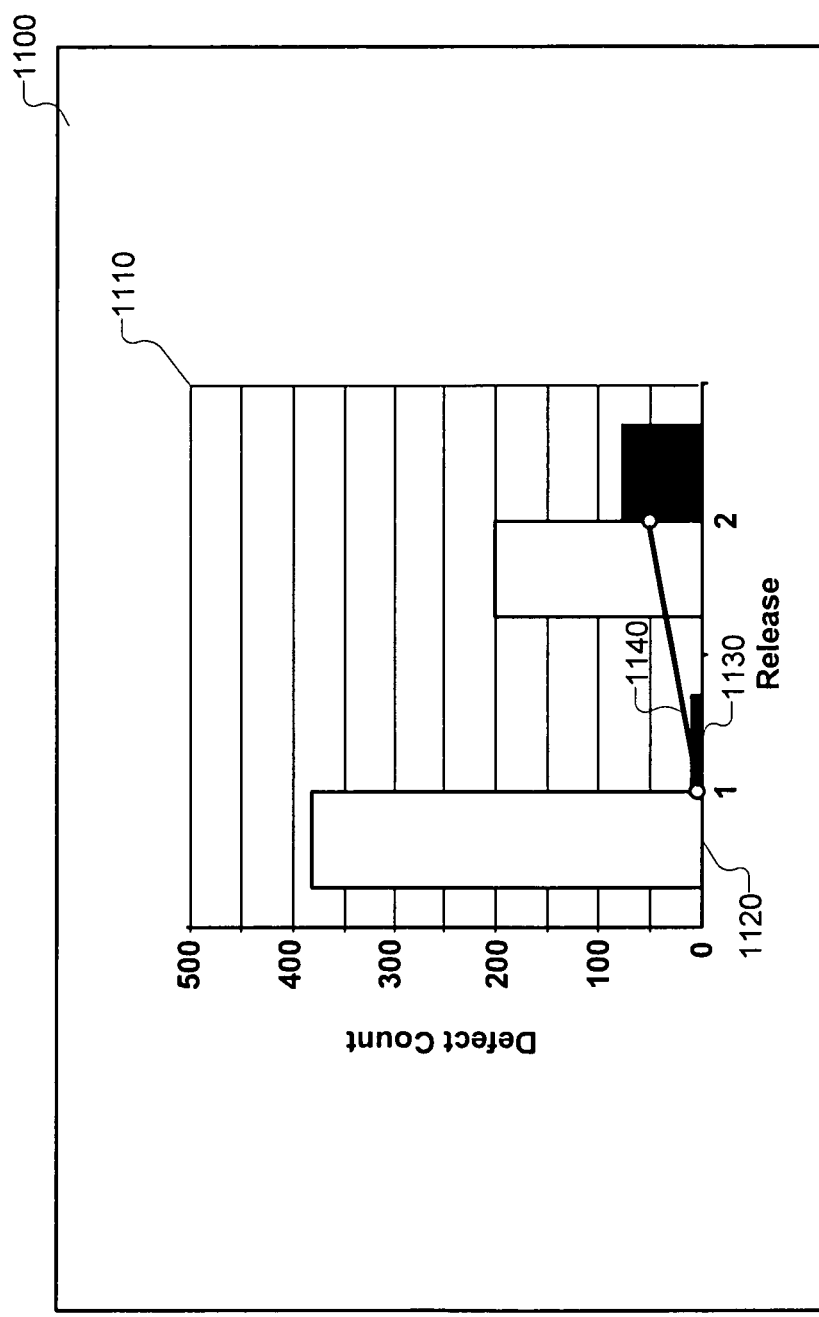
FIG. 11 illustrates a GUI configured to graphically depict how a defect propagation index changes based on a particular release of a software instance according to principles described herein.

To illustrate, FIG. 11 illustrates a GUI 1100 that may be generated and displayed by DPI generation facility 580 and that is configured to graphically depict how the defect propagation index changes based on the particular release of a software instance. As shown in FIG. 11, GUI 1100 may include a graph 1110 configured to graphically display a comparison of defects identified by one or more users of quality assurance subsystem 120 (represented by non-shaded bars, e.g., bar 1120) and defects identified by end users (represented by shaded bars, e.g., bar 1130). GUI 1140 may additionally or alternatively be configured to display a graphical representation 1140 of a defect propagation index corresponding to each of the software instance releases. By viewing graph 1110, a user may readily recognize trends or anomalies with regard to the defect propagation index associated with each release of the software instance.

In some examples, data associated with defects identified within a software instance may be transmitted by quality assurance subsystem 120 to development subsystem 110. The data may include data descriptive of the identified defects, data representative of one or more defect severity levels associated with the identified defects, data representative of one or more of the indices described herein, and/or any other data related to the identified defects as may serve a particular application.

In some examples, the development subsystem 110 may facilitate modification of the software instance in accordance with the transmitted data. For example, the development subsystem 110 may facilitate modification of the source code defining the software instance in order to address (e.g., fix) the identified defects.

Figure 12:
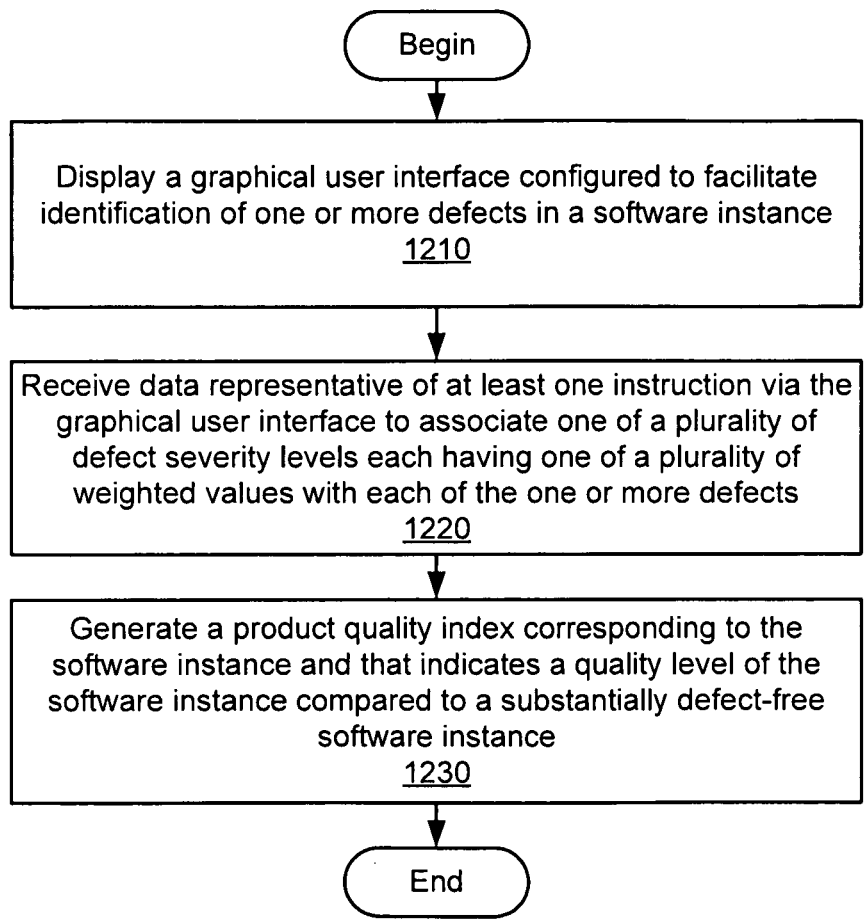
FIG. 12 illustrates an exemplary method of determining a quality level of a software instance according to principles described herein.

FIG. 12 illustrates an exemplary method of determining a quality level of a software instance. While FIG. 12 illustrates exemplary steps according to one embodiment, other embodiments may omit, add to, reorder, and/or modify any of the steps shown in FIG. 12.

In step 1210, a graphical user interface configured to facilitate identification of one or more defects in a software instance is displayed. The graphical user interface may be generated and displayed in any of the ways described herein. For example, the graphical user interface may be generated and displayed by quality assurance subsystem 120 and/or by any other device or system as may serve a particular application.

In step 1220, data representative of at least one instruction is received via the graphical user interface to associate one of a plurality of defect severity levels each having one of a plurality of weighted values with each of the one or more identified defects. The at least one instruction may be received in any of the ways described herein.

In step 1230, a product quality index corresponding to the software instance and that indicates a quality level of the software instance compared to a substantially defect-free software instance is generated. The generation of the product quality index may be based on the defect severity levels and the weighted values associated with the one or more identified defects.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    displaying a graphical user interface configured to facilitate identification by quality assurance personnel of one or more defects in a software instance;
    receiving, via said graphical user interface, data representative of at least one instruction to associate one of a plurality of defect severity levels each having one of a plurality of weighted values with each of said one or more defects;
    generating a product quality index corresponding to said software instance and that indicates a quality level of said software instance compared to a substantially defect-free software instance, said generating based on said defect severity levels and said weighted values associated with said one or more defects;
    receiving data representative of one or more additional defects identified by one or more end users of said software instance;
    determining a total number of common defects identified by both said quality assurance personnel and said one or more end users of said software instance;
    generating a defect propagation index by dividing said total number of common defects by a total number of said one or more defects identified by said quality assurance personnel;
    receiving data representative of at least one instruction to associate one of said plurality of defect severity levels with each of said one or more additional defects;
    generating a combined product quality index of said software instance, said generating of said combined product quality index based on said defect severity levels of said one or more defects and said one or more additional defects;
    and displaying a comparison of said product quality index and said combined product quality index.

2. The method of claim 1, further comprising:
    generating a test effectiveness index configured to measure an effectiveness of a certification process used by said quality assurance personnel, said generating of said test effectiveness index based on a difference between said product quality index and said combined product quality index.

3. The method of claim 1, further comprising:
    generating another product quality index corresponding to another version of said software instance;
    and comparing said another product quality index with said product quality index to determine a difference in quality between said software instance and said another version of said software instance.

4. The method of claim 1, wherein said software instance comprises one of a plurality of modules included within a software product.

5. The method of claim 1, further comprising facilitating manual modification of at least one of said weighted values.

6. The method of claim 1, further comprising facilitating manual association of said weighted values with said defect severity levels.

7. The method of claim 1, wherein said product quality index comprises a value in between zero and ten, wherein said ten corresponds to said substantially defect-free software instance.

8. The method of claim 1, tangibly embodied as computer-executable instructions on at least one computer-readable medium.

9. The method of claim 1, further comprising:
    determining a total number of lines of source code defining said software instance;
    and generating a defect density weightage index corresponding to said software instance by dividing said product quality index by said total number of lines of source code.

10. The method of claim 1, further comprising:
displaying, on said graphical user interface, one or both of said product quality index and said combined product quality index.

11. A system comprising:
at least one computing device that comprises:
a processing facility that directs a display to display a graphical user interface configured to facilitate identification by quality assurance personnel of one or more defects in a software instance;
a product quality index generation facility communicatively coupled to said processing facility and that
associates one of a plurality of defect severity levels each having one of a plurality of weighted values with each of said one or more defects in response to at least one instruction received via said graphical user interface, and
generates a product quality index corresponding to said software instance and that indicates a quality level of said software instance compared to a substantially defect-free software instance, said generation based on said defect severity levels and said weighted values associated with said one or more defects; a test effectiveness index generation facility communicatively coupled to said processing facility and that
receives data representative of one or more additional defects identified by one or more end users of said software instance,
receives data representative of at least one instruction to associate one of said plurality of defect severity levels with each of said one or more additional defects,
generates a combined product quality index of said software instance, said generation of said combined product quality index based on said defect severity levels of said one or more defects and said one or more additional defects, and
displays a comparison of said product quality index and said combined product quality index; and
a defect propagation index generation facility that
determines a total number of common defects including one or more defects identified by both said quality assurance personnel and said one or more end users; and
generates a defect propagation index by dividing said total number of common defects by a total number of said one or more defects identified by said quality assurance personnel.

12. The system of claim 11, wherein said test effectiveness index generation facility further generates a test effectiveness index configured to measure an effectiveness of a certification process used by said quality assurance personnel, said generation of said test effectiveness index based on a difference between said product quality index and said combined product quality index.

13. The system of claim 11, wherein said product quality index generation facility further:
generates another product quality index corresponding to another version of said software instance;
and compares said another product quality index with said product quality index to determine a difference in quality between said software instance and said another version of said software instance.

14. A system comprising:
at least one computing device that comprises:
a development subsystem configured to facilitate development of a software instance;
and a quality assurance subsystem selectively and communicatively coupled to said development subsystem, said quality assurance subsystem that:
displays a graphical user interface configured to facilitate identification by quality assurance personnel of one or more defects in a software instance;
receives data representative of at least one instruction to associate one of a plurality of defect severity levels each having one of a plurality of weighted values with each of said one or more defects,
generates a product quality index corresponding to said software instance and that indicates a quality level of said software instance compared to a substantially defect-free software instance, said generation based on said defect severity levels and said weighted values associated with said one or more defects;
receives data representative of one or more additional defects identified by one or more end users of said software instance;
determines a total number of common defects identified by both said quality assurance personnel and said one or more end users;
generates a defect propagation index by dividing said total number of common defects by a total number of said one or more defects identified by said quality assurance personnel;
receives data representative of at least one instruction to associate one of said plurality of defect severity levels with each of said one or more additional defects;
generates a combined product quality index of said software instance, said generation of said combined product quality index based on said defect severity levels of said one or more defects and said one or more additional defects;
and displays a comparison of said product quality index and said combined product quality index.

15. The system of claim 14, wherein:
said quality assurance subsystem transmits data associated with said one or more defects to said development subsystem;
and said development subsystem facilitates modification of said software instance in accordance with said transmitted data.

16. The system of claim 14, wherein said quality assurance subsystem further:
generates a test effectiveness index configured to measure an effectiveness of a certification process used by said quality assurance personnel, said generation of said test effectiveness index based on a difference between said product quality index and said combined product quality index.

17. The method of claim 1, further comprising:
generating a defect density weightage index;
and using the defect density weightage index to indicate a stability level of said software instance.

18. The system of claim 11, further comprising a defect density weightage index generation facility that generates a defect density weightage index, wherein said defect density weightage index generation facility further use said defect density weightage index to indicate a stability level of said software instance.

19. The system of claim 14, wherein said quality assurance subsystem further generates a defect density weightage index and uses said defect density weightage index to indicate a stability level of said software instance.

* * * * *